Patented February 9, 1904.

UNITED STATES PATENT OFFICE.

WILLIAM J. ARMBRUSTER, OF ST. LOUIS, MISSOURI.

PROCESS OF MAKING PIGMENTS.

SPECIFICATION forming part of Letters Patent No. 751,444, dated February 9, 1904.

Application filed October 13, 1902. Serial No. 127,176. (No specimens.)

*To all whom it may concern:*

Be it known that I, WILLIAM J. ARMBRUSTER, a citizen of the United States, residing at St. Louis, State of Missouri, have invented certain new and useful Improvements in Processes of Making Pigments, of which the following is a specification.

My invention has relation to improvements in processes of making pigments and reproduction of acids used in the initial treatment of zinc ores; and it consists in the novel series of steps more fully set forth in the specification and pointed out in the claims.

Broadly stated, the process contemplates the production of zinc and barium pigments. In the first instance a solution of zinc is obtained by treating an ore of zinc with an acid, and in the course of the operations zinc and barium pigments are produced, with the formation in final solution of an acid of like nature and equivalency to that used in the first instance for bringing the ore into solution, such reproduced acid being of course applicable for bringing a second lot of ore into solution, the process being, therefore, of a cyclical nature. Usually the by-products in production of precipitated pigments are salt solutions, the same being evaporated to a crystalline condition for converting them into a marketable form. In my process I have as a by-product an acid the same as used in the first instance in the treatment of the zinc ore for obtaining a solution of zinc. Often the profitable production of the pigments themselves is dependent upon whether the salt by-products can be marketed to advantage.

The advantage of my process under certain conditions will be readily understood when (instead of the special evaporation plant for recovering salt solutions and the difficulty of cooperage and expense of selling an additional product) an acid is obtained the same as used in the first instance for treatment of the zinc ore, thereby making what may be called a "self-contained" process.

The following is cited as a general illustration of the reactions occurring in the production of the zinc and barium pigments: To a solution of zinc nitrate a solution of barium hydrate is added. Zinc hydrate will be precipitated and barium nitrate formed in solution. The solution of barium nitrate is drained from the precipitate into a separate container and to it is added sulfuric acid, when barium sulfate will be precipitated and nitric acid formed in solution, the equation being as follows:

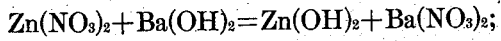

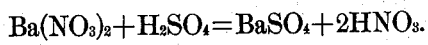

In practice the solution of zinc nitrate would be obtained in the first instance direct from the zinc ore by acting upon it with a solution of nitric acid. The nitric acid thus used would be practically reproduced at the end of each series of operations for use in acting upon more zinc ore to obtain a solution of zinc for the succeeding series of operations.

The sulfuric acid required in the course of operations can be obtained or produced from the sulfur gases set free from the zinc-sulfid ore by the action of the nitric acid upon it. Obviously the acid need not be applied directly to a sulfid ore of zinc, as this ore can first be roasted to form the oxid, in the course of which the sulfur is oxidized and recovered and converted into sulfuric acid. The nitric acid can be used in this instance upon the oxid formed.

It will be readily understood that the process is not limited to the specifically-mentioned salts of zinc or barium. For instance, a chlorid-of-zinc solution can be used, when hydrochloric acid will be formed in final solution, or an acetate-of-zinc solution can be used, when acetic acid will be formed in final solution. The acetic acid, however, is not so well adapted for use with sulfid ores of zinc, as its power of combination is weaker, and although it acts readily on the carbonate ores of zinc in the latter instance carbonic-oxid gas is set free and would not supply the sulfuric acid which is required in the reaction with the barium solution. The equation showing the reactions occuring with the use of zinc-chlorid solution is as follows:

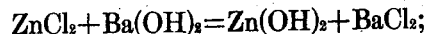

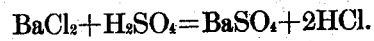

It will thus be seen that any ore of zinc can be treated, although the sulfid ores are preferable; also, that nitric, hydrochloric, and acetic acid can be used, but that in practice the nitric acid and hydrochloric acid are more suitable. Equally so, a mixture of the acids can be used instead of a single acid.

Barium sulfate, of all known precipitates, most readily and felicitously lends itself to a reaction whereby a precipitate is produced in the presence even of a strong acid, this substance being so little soluble. The zinc precipitate is of course in no danger of being acted upon by the acid formed in solution, as it is previously separated, and the reaction occurring between the barium solution and the sulfuric acid takes place in a separate container; nor is the barium solution that can be used or adapted to the process limited to the hydrate of barium. The sulfid lends itself readily as a full equivalent for the hydrate, but with its use the zinc will be precipitated as the sulfid. The sulfid of zinc, either alone or mixed with the barium sulfate, is a valuable pigment, sold usually under the name of "lithophone." The following equation will give an illustration of the reactions occurring when barium sulfid is used:

$$ZnCl_2 + BaS = ZnS + BaCl_2;$$

$$BaCl_2 + H_2SO_4 = BaSO_4 + 2HCl.$$

The precipitates of zinc and barium may of course be marketed separately or intimately mixed in a suitable manner and marketed as a composite pigment. The zinc hydrate is preferably converted to oxid by any suitable means, such as calcination. This can be accomplished either before or after admixture with the barium sulfate.

As ores of zinc usually contain other metals or impurities, such as iron, a solution of zinc obtained directly from the ore will generally be impure, and an impure solution of zinc, especially when it contains iron, is not immediately suitable for the production of white pigment. The iron would be precipitated as hydrate or sulfid along with the zinc, and as the hydrate and sulfid of iron are dark in color the zinc-white would be discolored. To one skilled in the art it therefore becomes apparent that after the solution of zinc is obtained from the ore and before the precipitation of the zinc the solution must be freed from the deleterious impurities, which can be accomplished by one of the usual modes of the art. As an illustration of the methods by which the iron as an impurity may be eliminated, the following may be cited: In the case of ores containing gangue of a specific gravity rendering concentration impracticable, as in the case of zinc ores containing a large per cent. of heavy spar, (barium sulfate,) the solution of the ore is effected by means of nitric acid, as aforesaid, in which case the iron will be in the form of nitrate. This may be removed from the zinc solution by heating in the open air and stirring and adding a small quantity of zinc carbonate or oxid. Freshly-precipitated zinc hydrate also acts well, and the zinc carbonate is more active when freshly precipitated. Other carbonates—such as barium, calcium, and magnesium—if freshly precipitated, are also efficient; but the zinc carbonate or oxid is preferable, as the solution formed in the reaction between it and the iron solution is a zinc solution the same in nature as the main body solution which it is intended to purify. The reaction in the illustration is as follows:

$$Fe_2(NO_3)_6 + 3ZnCO_3 + 3H_2O = \\ 2Fe(OH)_3 + 3Zn(NO_3)_2 + 3CO_2.$$

Where, on the other hand, the character of the ore is such as to admit of ready concentration, as in the case where the gangue is chiefly limestone, I prefer hydrochloric acid as the solvent of the ore, the latter (if a sulfid) being roasted and converted into the oxid before the addition of the solvent thereto. In the latter case the reaction would be as follows:

$$Fe_2Cl_6 + 3ZnCO_3 + 3H_2O = \\ 2Fe(OH)_3 + 3ZnCl_2 + 3CO_2.$$

The ferric hydrate thus precipitated in the zinc solution can be separated therefrom, when the latter is left comparatively pure to receive the barium hydrate by which the zinc is precipitated. To the barium solution thus remaining the sulfuric acid is added when the barium is precipitated as the sulfate, leaving a comparatively pure acid solution to act on a fresh batch of ore.

It is true that where a nitrate such as sodium is obtained as a by-product in one of the usual processes nitric acid can be obtained therefrom by distilling it with sulfuric acid, with the by-production of a sulfate, such as sulfate of soda; but this adds an extra distinct process and expense, whereas in my process the nitric or other acid can be reproduced by simply bringing together two solutions which react even in the cold, at the same time performing valuable work, inasmuch as one of the products—barium sulfate—is produced coincidently. The acid formed becoming during the repetition of the process more dilute can readily be concentrated by evaporation as desired. As a practical commercial illustration the following may be cited, the same to be considered, however, in relation to the other steps of the process already indicated: Separate solutions are prepared in the proportions specified—zinc nitrate, one hundred and eighty-nine pounds; barium hydrate, one hundred and seventy-one pounds, and sulfuric acid, ninety-eight pounds, (at one hundred per cent. or one hundred and ninety-six pounds of fifty per cent. acid.) The zinc nitrate and barium hydrate are mixed together, when ninety-nine pounds of zinc hydrate is precipitated and two hundred and sixty-one pounds of barium nitrate formed in solution. The latter is drained into a separate container and the sulfuric acid added to it, when two hundred and thirty-three pounds of barium sulfate is precipitated and one hundred and twenty-six pounds of nitric acid formed in solution. The figures given above do not, of course, take into account the water of crystallization.

The precipitates recovered should, of course, be well washed before drying.

I may, of course, invoke the doctrine of chemical equivalents wherever the same may apply.

It is not intended that the processes should be applied indiscriminately or directly to ores as taken from the mines in the crude state. It is expected and it will be found advisable in almost all instances to first enrich the ores by the system of ore-dressing called "concentration," thereby first getting rid of acid-consuming gangues producing undesirable by-products. For instance, much zinc-blende is mined with an enormous percentage of limestone gangue, some containing eight per cent. zinc-blende, ninety-two per cent. calcium carbonate. The difference in specific gravity between the limestone gangue and the blende readily enables them to be separated by concentration, producing thereby a very high grade of rich ore—upward of ninety per cent. zinc-blende. It will therefore be readily seen that it would be much more profitable and advantageous in such cases to first concentrate the ores before applying the acid for bringing the same in solution.

The process is also applicable to the successful treatment of complex ores. As an instance a certain complex ore consisting of thirty-five per cent. barytes, forty per cent. limestone, and twenty-five per cent. zinc-blende with a trace of iron will be mentioned. Such an ore has been condemned as unavailable for general commercial treatment, owing to the fact that concentration can only separate satisfactorily the limestone, leaving the zinc-blende mixed with more than its own weight of barytes. Such a concentrate is not practically available for treatment in the Belgian zinc-furnace, as the percentage of barytes present in the ore constitutes too much of an extraneous substance to take up the valuable and limited space in the tile retorts of the furnace, remembering that this space is already limited by the size of the tiles that can be used and the quantity of carbon that must also be included and mixed with the ore in the retorts. A concentrate of that nature can, however, be readily treated by this process, as the application to it of the required acid will dissolve only the zinc, leaving the barytes unacted upon, which can then also be recovered and after washing and drying will constitute a fine quality of acid-bleached barytes. While the process can begin very well with the application of the acid to zinc-blende concentrates of the grade usually sold to the smelters, yet I prefer that the same be first roasted to the oxid state, as the oxid of zinc is so much more readily than the native sulfid dissolved by the acids used, the sulfur dioxid disengaged in the roasting being converted into sulfuric acid used in a later connected step of the process. When the acid is used directly upon the zinc-blende concentrates, I prefer to use nitric acid, which is more active, and the sulfur is then largely disengaged in the free solid state, while the gases set free can be conducted into a tank containing water by a pipe dipping under the water and recovered. Zinc-blende is not as readily acted upon by hydrochloric acid as by nitric acid, and with hydrochloric acid the sulfur is all set free in the form of hydrogen sulfid—an undesirable by-product and difficult to recover the sulfur from. Obviously this criticism does not apply against the desirability of hydrochloric acid when the crude zinc oxid is acted upon instead of the sulfid. Acetic acid can also readily be applied as the solvent of the crude oxid formed from the roasted ore, as stated, and with this acid formed in final solution for use in a succeeding series of operations there will be less danger of any of the precipitated barium sulfate being slightly dissolved by the final acid solution, this being a weaker acid.

Having described my invention, what I claim is—

1. In the manufacture of pigments, the process of subjecting zinc ores to the action of a suitable acid solvent, then precipitating the zinc by means of a soluble compound of barium, and finally treating the resulting solution with sulfuric acid thereby producing a subsequent precipitate of barium sulfate and restoring the composition of the original solvent, substantially as set forth.

2. In the manufacture of pigments, the process of subjecting a zinc compound to the action of a suitable solvent, then precipitating the zinc by means of barium hydrate, and finally treating the resulting solution with sulfuric acid thereby producing a subsequent precipitate of barium sulfate and restoring the composition of the original solvent, substantially as set forth.

3. In the manufacture of pigments, the process of subjecting a compound of zinc to the action of a suitable acid solvent, then mixing the solution with barium hydrate, draining the solution from the precipitate thus formed, mixing said solution thus drained with sulfuric acid, washing and recovering and finally mixing the resulting precipitates, and restoring the composition of the original acid solvent, substantially as set forth.

4. In the manufacture of pigments, the process of subjecting an ore of zinc to the action of a suitable acid solvent, eliminating any impurities from the solution, precipitating the zinc from the solution thus purified by the addition of a soluble compound of barium, draining the resulting solution, mixing the latter with sulfuric acid, and washing and recovering, and mixing the resulting precipitates, substantially as set forth.

5. In the manufacture of pigments, the process of subjecting an ore of zinc to the action of a suitable acid, eliminating any iron impurities by the addition of suitable quantities of a zinc salt thereto, removing the precipitated impurities, adding a soluble compound of barium to the solution thus purified whereby the zinc is precipitated, draining the resulting solution, adding sulfuric acid thereto thereby precipitating the sulfate of barium and restoring the composition of the original acid solvent, and washing, recovering and mixing the resulting precipitates, substantially as set forth.

In testimony whereof I affix my signature in presence of two witnesses.

WILLIAM J. ARMBRUSTER.

Witnesses:
 EMIL STAREK,
 G. L. BELFRY.